Aug. 28, 1945. F. R. MAYS ET AL 2,383,668
TIRE
Filed Feb. 1, 1943 2 Sheets-Sheet 1

Inventors
Floyd R. Mays
Robert R. Royal
By Henry Fuchs
Atty.

Aug. 28, 1945.　　F. R. MAYS ET AL　　2,383,668
TIRE
Filed Feb. 1, 1943　　2 Sheets-Sheet 2
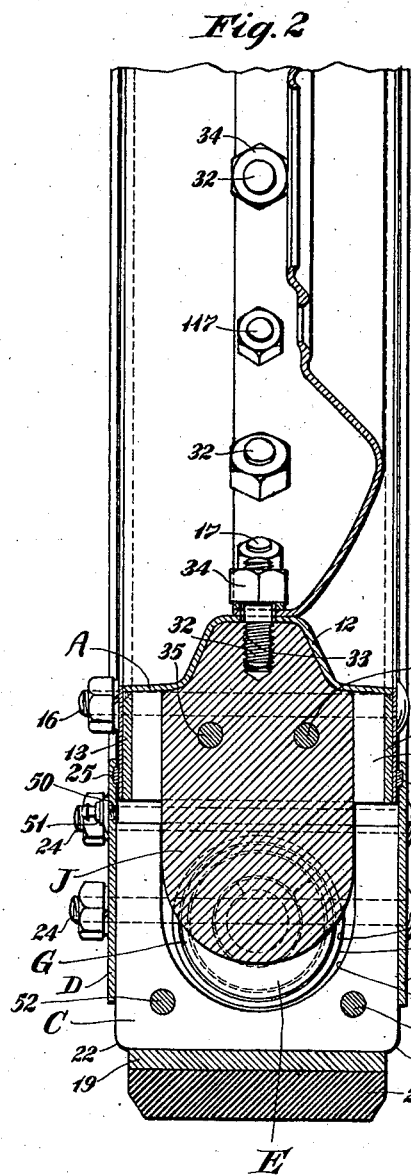
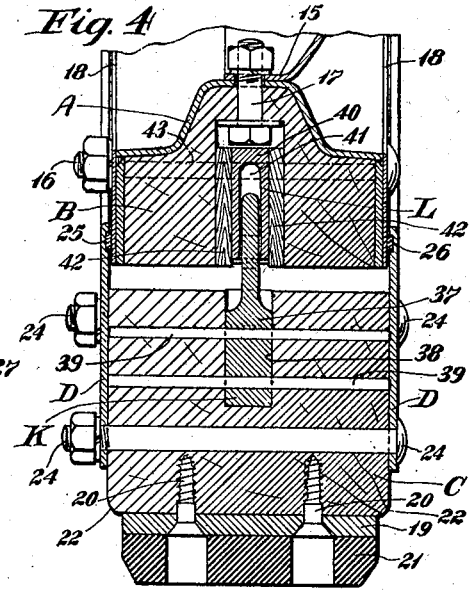
Inventors
Floyd R. Mays
Robert R. Royal
By Henry Fuchs, Atty.

Patented Aug. 28, 1945

2,383,668

UNITED STATES PATENT OFFICE 2,383,668

TIRE

Floyd R. Mays, Chicago, Ill., and Robert R. Royal, Paducah, Ky.

Application February 1, 1943, Serial No. 474,294

5 Claims. (Cl. 152—93)

This invention relates to tires for automotive vehicles, and more particularly resilient tires for use on wheels of such vehicles.

One object of the invention is to provide a tire adapted to be applied to the wheel of an automotive vehicle, wherein spring and friction means are employed to effectively absorb the shocks to which the vehicle is subjected in service.

A further object of the invention is to provide a tire of the character indicated, comprising inner and outer rims which are relatively displaceable toward and away from each other radially of the wheel and are also adapted to have slight relative rotation, and shock absorbing means in the form of spring resisted units carried by one of the rims and cooperating friction posts carried by the other rim adapted to compress the spring units and also have frictional engagement therewith, to yieldingly oppose said relative radial movement and said relative rotation, thereby absorbing the shocks while the vehicle is traveling over a roadway, as well as the shocks due to driving torque.

Other objects of the invention will more clearly appear from the description and claims hereinafter following.

Figure 1:
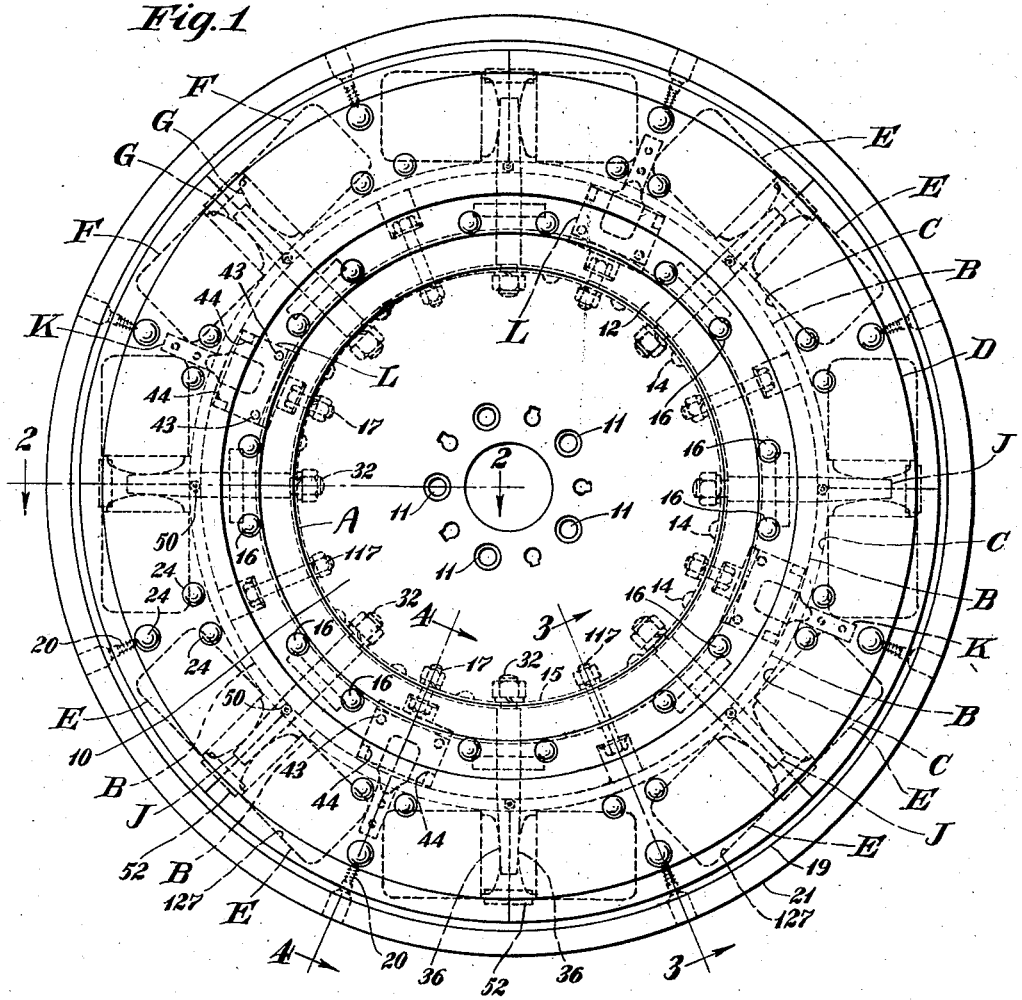
Figure 5:
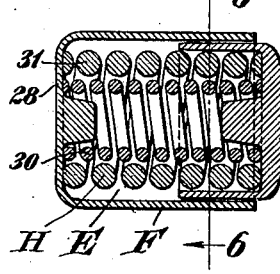
Figure 6:
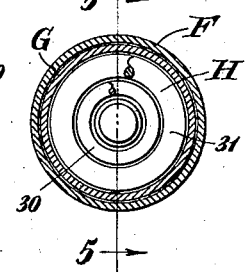

In the drawings forming a part of this specification, Figure 1 is a side elevational view of a wheel of an automobile or motor truck, illustrating our improvements in connection therewith. Figure 2 is a transverse, radial, sectional view, corresponding substantially to the line 2—2 of Figure 1, said view being on an enlarged scale. Figures 3 and 4 are transverse, radial, sectional views, on an enlarged scale, corresponding respectively to the lines 3—3 and 4—4 of Figure 1, showing the tire and a broken portion of the wheel. Figure 5 is a longitudinal, sectional view of one of the spring units employed in the improved tire, said view corresponding substantially to the line 5—5 of Figure 6. Figure 6 is a transverse, vertical, sectional view, corresponding substantially to the line 6—6 of Figure 5.

In said drawings, 10 designates a wheel of an automotive vehicle of the well-known disc type, which has the usual bolt receiving openings 11 therethrough to accommodate the bolts for fastening the disc to the wheel hub of the vehicle.

Our improved tire structure comprises broadly an inner ring A of channel-shaped transverse cross section fixed to the disc 10; an annular series of hardwood segments or blocks B—B seated in the channel of the ring A and fixed so said ring; a second annular series of hardwood segments or blocks C—C surrounding the series B—B and spaced therefrom; flat ringlike side plates D—D at opposite sides of the outer series of blocks, secured to the latter and telescoped over the sides of the channel ring A; shock absorbing spring units E—E carried by the blocks C—C, each comprising a housing F, a friction cap G, and a spring resistance H; friction posts J—J carried by the blocks B—B and cooperating with the spring units E—E; centering blades K—K carried by the blocks C—C; and centering guides L—L carried by the blocks B—B.

The inner ring A comprises an annular main body portion 12 provided with outstanding, laterally spaced, circular flanges 13—13 at opposite sides thereof, the ring structure thus being of substantially channel-shaped transverse cross section. The main body portion 12 is of the cross section shown most clearly in Figures 2, 3, and 4, and corresponds to the cross section shape of a well known type of rim commonly employed on automobile wheels. The flanges 13—13 may be formed in one piece with the main body portion 12, but as herein illustrated are formed of separate pieces, welded to the portion 12 adjacent the outer edges thereof. The ring A is fixed to the disc 10 of the wheel by rivets 14—14 extending through the body portion 12 of the ring A and an annular peripheral flange 15 of the disc 10.

The blocks or segments B—B, which are of hardwood, are preferably eight in number, as illustrated in the drawings. Each block has the inner side thereof shaped to fit the interior contour of the ring A. The blocks B are all of the same size and are arranged in annular series within the channel of the ring A. These blocks engage end to end and are of such a thickness that they fill the channel with their outer faces flush with the peripheral edges of the flanges 13—13 of the ring A. Each block B is secured to the ring A by a pair of circumferentially spaced, transversely disposed bolts 16—16 extending through the block and the flanges 13—13 of the ring or annulus A. In addition, each block B is anchored to the main body portion 12 of the annulus A by radially disposed bolts 17—17 extending through the block, the inner wall of the body portion 12 of the annulus A, and the flange 15 of the disc 10. As shown, the block B is countersunk to accommodate the heads of the bolts so that the outer surface of the block is free of any projections. At the outer sides the flanges 13—13 of the ring A are covered by hardened wear plates 18—18 of ring shape. These wear plates are clamped to the flanges 13—13 by the transverse bolts 16 which serve to secure the blocks B—B.

The blocks C—C, which are also preferably of hardwood, correspond in number to the blocks B—B and are directly opposed thereto. The blocks C—C are a little wider than the blocks B—B. As clearly shown in Figures 3 and 4 each block C is of a width as great as the corresponding block B, plus the thickness of the flanges 13—13 and the plates 18—18 of the ring A which embrace the block B.

The blocks C—C are arranged in annular series surrounding the blocks B—B and are enclosed by a steel band 19 secured thereto by screws 20—20. The steel band is preferably covered by an annular tread of thin rubber 21 to deaden the noise on concrete roads. As shown most clearly in Figures 2, 3, and 4, the blocks are rounded off, as indicated by 22—22, at their outer corners to prevent fraying off as wear takes place in traveling over the road. The blocks C—C are preferably connected by dowel pins 52—52.

The annulus of blocks C—C is embraced at opposite sides by the ringlike side plates D—D. These side plates, which are substantially flat, are preferably of steel. The blocks C—C are clamped between the side plates D—D by a series of transverse securing bolts 24—24 which extend through said side plates and the blocks, three bolts being preferably employed for each block.

At their inner sides the plates D—D overlap the flanges 13—13 of the ring or annulus A, being telescoped over these flanges. At the zone where the plates D—D overlap the flanges 13—13, they are provided with interior annular grooves 25—25 in which rings 26—26 of packing material are seated. The packing rings 26—26 bear on the wear plates 18—18 and serve to hermetically seal the opening between the side plates D—D and the flanges 13—13 of the annulus A.

The shock absorbing spring units E—E are sixteen in number, arranged in sets of two, and are carried by the blocks C—C of the outer rim. Each block C is recessed at opposite ends to provide seats 127—127 to accommodate the corresponding spring units E—E, the seat at each end of each block being in axial alignment with the seat of the adjacent block, so that the pairs of spring units of adjacent blocks are in axial alignment. Each spring unit E comprises a cylindrical housing F closed at its inner end by a transverse bottom wall 28. The housing F is open at its outer end and has slidable in said open end a friction cap G which normally projects beyond the end of the housing. The cap G has a convex outer friction surface 29 as clearly shown in Figure 5, the convex surface being preferably provided with a flat spot 129 at the center of sufficient size to reduce wear. The housing F contains the spring resistance H, which is composed of inner and outer spring coils 30 and 31 interposed between the bottom wall 28 of the housing and the cap G. The springs 30 and 31 are preferably under initial compression in the assembled condition of the tire structure. As will be clear from Figure 1, the spring caps G—G of each pair of adjacent spring units E—E face each other and have the corresponding friction post J extending therebetween.

The friction posts J—J, which are eight in number, are interposed respectively between adjacent blocks B—B of the inner ring, the ends of these blocks being properly recessed to accommodate the posts. Each post J is in the form of a relatively heavy plate of the transverse section shown in Figure 2. The inner end of each post fits the contour of the main body portion 12 of the ring A and is secured to the ring A by a stud screw 32 having its inner end threaded into a screw threaded socket 33 of the post. The shank of the stud screw 32 extends through the body portion 12 of the ring A and the flange 15 of the disc 10 and has a nut 34 threaded on its outer end by which the post J is clamped tightly to the ring A. Each post is further anchored to the inner rim of the tire by a pair of dowel pins 35 extending through the post and into seats adjacent the blocks B—B. The friction posts J—J extend radially of the wheel and have their outer ends which engage between the caps G—G of the corresponding pair of spring units E—E, slightly tapered, as indicated at 36—36. The blocks are recessed, as indicated at 27—27, to provide clearance for the outer ends of the friction posts J—J. The friction posts J—J are properly lubricated, the outer cover plate D of the outer rim of the tire being provided with suitable openings 50—50 through which the lubricant may be injected. The openings 50—50 are in alignment with the respective posts J—J at a point between the ends thereof. Suitable fittings 51—51 are secured to the outer plate D at said openings 50—50 to which the discharge tube or nozzle of a greasing device is connected when it is found necessary to lubricate the posts.

The centering blades K—K, which are four in number, are carried by alternate of the outer blocks C—C and project inwardly toward the center of the wheel, one blade being provided for each alternate block. These blades are arranged in a plane at right angles to the axis of rotation of the wheel and centrally of the series of blocks C—C. Each blade K has a relatively heavy outer end portion or base 37 seated in a pocket 38 midway between the ends of the corresponding block and is secured by a pair of dowel pins 39—39 extending through said base and block, as clearly shown in Figure 4.

The centering guides L—L are four in number and are carried by alternate blocks B—B of the inner ring in opposed relation to the blades K—K of the outer ring. Each guide L comprises a relatively heavy metal block 40 which is longitudinally slotted, as indicated at 41, to slidably receive the thinner inner end portion of the corresponding centering blade K. As shown in Figure 1, the length of the slot 41 is considerably greater than the width of the blade K to allow for the required relative rotary movements of the inner and outer rims of the tire. The guides L—L are fixed in position by blocks 42—42 at opposite sides of the same having a driving fit with the walls of the opening in the block B and the block 40. To further secure the guides L—L, a pair of dowel pins 43—43 are employed, which extend through the guides L—L, blocks 40—40, and blocks B—B. Spacers 44—44 are preferably provided at opposite ends of the slot 41 of each block 40 to maintain the proper spacing between the walls of the slot to prevent binding or clamping of the blade K. As will be evident, the blades K—K in cooperating with the guides L—L keep the outer and inner rims in alignment, that is, prevent relative lateral displacement thereof, thereby preventing bending of, or other damage to, the side plates D—D of the outer rim of the tire, which might otherwise occur when the wheel comes in contact with the curbing of a street or other obstruction.

In the operation of our improved tire, shocks due to roughness of the road on which the vehicle is traveling are effectively absorbed by the spring units E—E and the cooperating spreading friction posts J, the same cushioning the bouncing movement of the outer rim of the tire and permitting the required relative movement of the outer rim with respect to the inner rim, thus either preventing entirely communication of shocks to the inner rim or reducing the same to such an extent that they are neutralized and have practically no effect. In absorbing these shocks as the outer rim approaches the inner rim, the tapered portions of the friction posts J travel between the caps G—G of the corresponding pairs of spring units E—E, thus compressing the springs and cushioning the shock. In addition, the cushioning effect will be augmented by the friction created between the friction posts J and the caps G—G of the spring units E—E. A snubbing action is thus also provided by the friction posts in cooperation with the caps G—G of the units E—E. It is further pointed out that relative rotation of the inner and outer rims of the tire is also opposed by the springs of the units E—E inasmuch as the posts J carried by the inner rim will rotate with this rim and effect compression of the corresponding spring units by forcing the spring caps G thereof inwardly of the housings F against the resistance of the springs 30 and 31. The shocks sustained due to driving torque are thus effectively absorbed.

From the preceding description taken in connection with the drawings, it will be evident that we have provided an exceedingly efficient tire which effectively absorbs the shocks encountered in traveling on roadways, as well as shocks resulting from driving torque, and that our improved tire entirely eliminates the necessity of employing inflated rubber tires as cushioning means for the wheels of automotive vehicles.

We have herein shown and described what we now consider the preferred manner of carrying out our invention, but the same is merely illustrative and we contemplate all changes and modifications that come within the scope of the claims appended hereto.

We claim:

1. In a tire for wheels of automotive vehicles, the combination with outer and inner annular rims, adapted for relative movement toward and away from each other in radial direction; of opposed spring units mounted on one of said rims, each spring unit including a pair of opposed spring follower caps, and springs under initial compression opposing separation of said follower caps; and tapered spreading members on the other rim, each spreading member being slidingly engageable between the units of one of said opposed sets to compress the same upon relative approach of said rims and thereby cushion shocks.

2. In a tire for wheels of automotive vehicles, the combination with outer and inner annular rims, adapted for relative movement toward and away from each other in radial direction; of opposed spring units mounted on one of said rims, each unit comprising a housing, a sliding cap telescoped within the housing and spring means in the housing opposing inward movement of said cap, said spring means being under initial compression, said caps facing each other; and a spreading member on the other rim having sliding frictional engagement between the caps of said units to oppose relative approach of said rims.

3. In a tire for wheels of automotive vehicles, the combination with outer and inner annular rims, adapted for relative movement toward and away from each other in radial direction; of opposed spring units mounted on one of said rims, each unit comprising a housing, a sliding cap telescoped within the housing, and coil springs within the housing opposing relative movement of the housing and cap, said caps facing each other, said cap and housing of each unit having centering bosses thereon engaging within said springs to center the same; and radial posts on the other rim engaged between the caps of opposed spring units to compress one of each of said opposed units upon relative rotation of said rims to yieldingly cushion said relative rotary movement.

4. In a tire for wheels of automotive vehicles, the combination with outer and inner annular rims, adapted for relative movement toward and away from each other in radial direction; of opposed spring units mounted on one of said rims disposed lengthwise of the curvature of said rim, each of said units comprising a housing, a sliding cap telescoped within the housing, and spring means within the housing opposing relative movement of the housing and cap, said caps of opposed units facing each other and said spring means being under initial compression to force said caps toward each other; and spreading members on the other rim, each spreading member having sliding frictional engagement between the caps of the units of one of said opposed sets to resist relative approach of said rims and thereby cushion shocks.

5. In a tire for wheels of automotive vehicles, the combination with outer and inner annular rims, adapted for relative movement toward and away from each other in radial direction; of opposed spring units mounted on one of said rims; a friction post on the other rim having sliding frictional engagement between said units to resist relative approach of said rims; blocks seated in one of said rims, said blocks being arranged in annular series in circumferentially spaced relation, each block having a guide slot in a plane at right angles to the axis of rotation of the wheel; and a plurality of projecting blades fixed to the other rim in parallelism to said slots and in radial and circumferential slidable engagement therein lengthwise thereof, thereby holding said rims against relative lateral displacement.

F. R. MAYS.
ROBERT R. ROYAL.